April 29, 1952 A. V. BEDFORD 2,594,382

REGISTRATION MONITORING

Filed Sept. 9, 1948 2 SHEETS—SHEET 1

Inventor
ALDA V. BEDFORD

By Olin J. Mitchell

Attorney

REGISTRATION MONITORING

Filed Sept. 9, 1948

Inventor
ALDA V. BEDFORD

By
Olin J. Mitchell
Attorney

Patented Apr. 29, 1952 2,594,382

UNITED STATES PATENT OFFICE 2,594,382

REGISTRATION MONITORING

Alda V. Bedford, Princeton, N. J., assignor to Radio Corporation of America, a corporation of Delaware Application September 9, 1948, Serial No. 48,391

10 Claims. (Cl. 178—5.2)

This invention relates to electrical monitors, and more particularly to image registration monitors for color television systems and the like.

The transmission by electricity of images in finite detail and discontinuous or limited motion has best been solved by the process of scanning, which consists of moving an exploring element, spot or point over the image to be transmitted in a periodically repeating path covering the total image area. The exploring element generates a signal which is indicative of the brightness of the image area at the instantaneous position of the exploring point. The signal is then transmitted over the communication channel to the reproducing station where a like spot or point of brightness is controlled by the signal and whose movement is in synchronism with the exploring point at the transmitting station, which causes an image to be reproduced.

It has become quite familiar to the television art that images in substantially their natural color may be reproduced at a remote location by not only dividing the images into elemental areas and transmitting electrical signals representative of the intensity of the various elemental areas taken in an orderly sequence of scanning, but by also dividing the image into selected component colors and separately transmitting information relating to the separated selected component color images and reconstructing the color image at the receiving station by combining the several images in registry.

It will be appreciated, however, that the superpositioning in registry of component color images must be accomplished to a reasonable degree of accuracy in order to provide for satisfactory natural color images. An important factor is, of course, the accurate registry of the several image pickup devices at the transmitting station.

Various arrangements have been proposed for mechanically and electrically registering each of a plurality of scanning devices. In order, however, to successfully employ such devices it is necessary to have accurate information regarding misregistration.

According to this invention, methods and arrangements are provided for accurately indicating registration of multiple scanning devices.

According to this invention, an electrical comparison is made between two of a plurality of signal trains, and corresponding image elemental area registration is indicated on the screen of a cathode ray tube.

A primary object of this invention is to provide for improved multiple image registration indication.

Another object of this invention is to provide for more accurately registered image signals of a color television system.

Another object of this invention is to provide for simple and accurate monitoring of the registration of the various component color image scannings in a color image pickup device.

Other and incidental objects of the invention will be apparent to those skilled in the art from a reading of the following specification and an inspection of the accompanying drawing in which.

Figure 1:
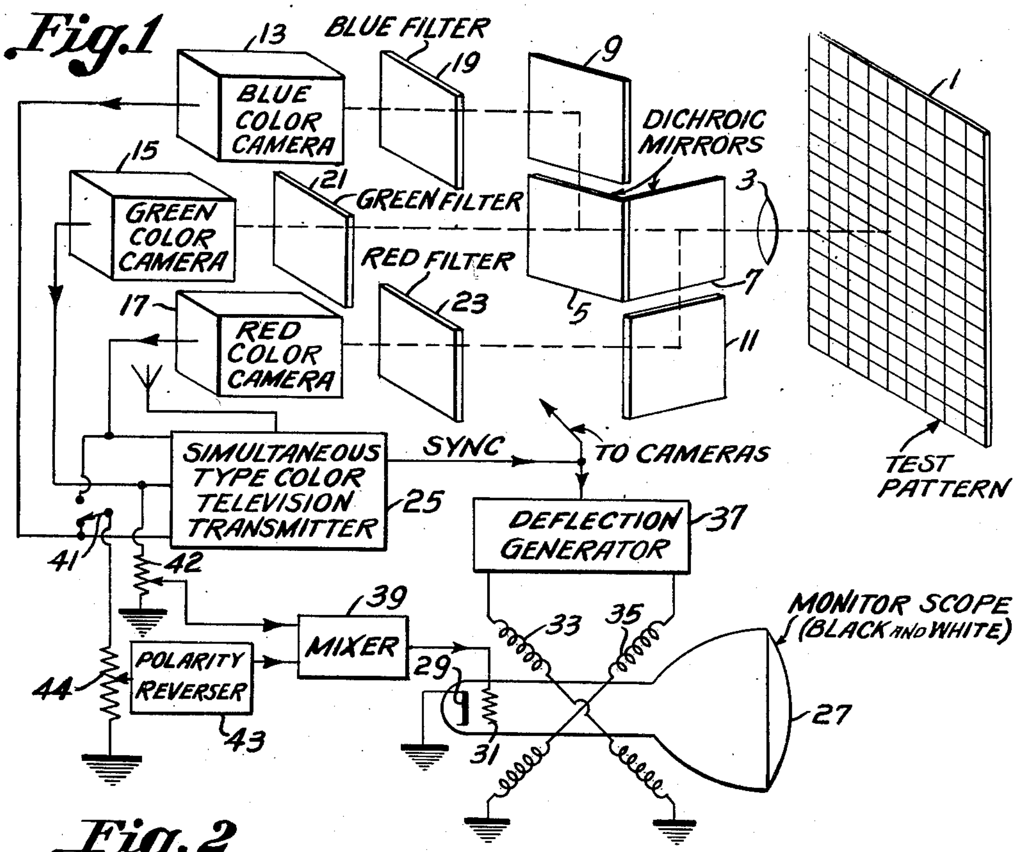
Figure 1 illustrates by block diagram one form of this invention as applied to a color television system.

Turning now in more detail to Figure 1, there is shown an image pickup arrangement of the simultaneous type.

A test pattern 1 is illustrated as a black and white cross sectioned placard. An optical system including a lens 3 projects light from test pattern 1 through dichroic mirrors 5 and 7 wherein, in accordance with the operation of dichroic mirrors, light from test pattern 1 is divided into several selected component colors. Mirrors 9 and 11 are positioned to direct the component color images to the color cameras 13, 15 and 17 which are designated as blue, green and red color cameras, respectively.

Although not essential for color separation when dichroic mirrors are employed, appropriate color filters 19, 21 and 23 are included in the optical paths.

In accordance with the well known practice, the color cameras 13, 15 and 17 provide a simultaneous type signal involving the several different component color representative signal trains to the simultaneous type color television transmitter illustrated by block 25.

It will, of course, be seen that the optical, mechanical and electrical characteristics of the several color cameras may differ slightly from each other and cause misregistration of the several images at the receiver. It is therefore important that adjustments be made in the image pickup arrangement to provide image representative signals which are derived from accurately registered scanning.

Cathode ray tube 27, termed monitor scope, includes the customary electron gun 29, an intensity control electrode 31, and associated horizontal and vertical deflecting coils 33 and 35. Monitor scope 27 may, for example, take the form of a kinescope.

The deflecting coils 33 and 35 receive their energy from deflection generator 37 which is synchronized at the same frequency that is employed to synchronize the scanning of the several cameras 13, 15 and 17.

A mixer 39 receives energy from the green signal channel to combine it with signal energy obtained from one of the other channels selectable by switch 41. There is also included in one of the input circuits of mixer 39 a polarity reverser 43 which inverts the signal applied to the mixer. The combined signals from mixer 39 are applied to control electrodes 31 of the monitor scope 27. Adjustable gain controls 42 and 44 are included for adjustment of both signals to proper levels for comparison.

The operation of the three-camera system is quite well known to the art, but an understanding of the operation of this invention may perhaps be best obtained by reference to Figures 2, 3, 4 and 5, giving examples of misregistration indication which may be obtained by the practice of this invention.

Figure 2:
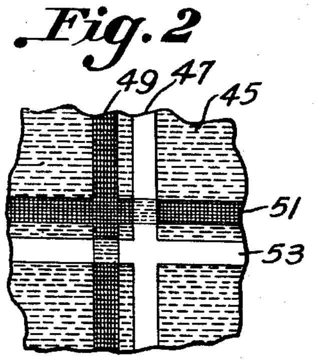
Figures 2, 3, 4 and 5 are illustrative of the operation of this invention in one of its forms.

Figure 2 illustrates the appearance of a small section of the screen of the monitor scope 27. The small section includes a single cross of the lines on the test pattern 1 of Figure 1.

Let it be assumed, for example, that the bias of control electrode 31 of the monitor scope 27 is adjusted so that with no signal, the background is gray, as illustrated by numeral 45 of Figure 2.

As the scanning point of the green color camera 15 crosses a vertical line on the test pattern 1, a vertical line 47, shown as greatly enlarged, is projected as a white line on the screen of monitor scope 27. If the switch 41 is thrown in the position, as indicated, a signal from the blue color camera 13 will be applied to the polarity reverser 43 and combined in the mixer 39 to be impressed on control electrode 31 to form a black line 49 if, as illustrated, the two cameras are not properly registered. If, for example, the scanning direction is from left to right and the blue scanning is slightly ahead of the green scanning, black line 49 of Figure 2 will occur to the left of white line 47, as shown.

When the scanning of the blue color camera 13 has progressed downward until it scans a horizontal line of test pattern 1, the black line 51 will appear on the monitor scope. If, as illustrated, the green color camera 15 is out of vertical registry with the blue color camera 13, the white line 53 will occur at a lower position and thus an indication, as shown in Figure 2, will show that the green and blue color cameras 15 and 13 are out of registry in both the horizontal and vertical direction. Furthermore, the illustration of Figure 2 shows that the blue color camera is out of registry in an upward and leftward direction.

The registration error may, of course, vary over the entire image. If, for example, at another point on the image there exists a closer registration in a vertical direction and an equal misregistration in the horizontal direction, an indication will be obtained such as that in Figure 3, wherein it will be seen that the horizontal line 55 of the blue camera has lowered to a position just adjacent to the horizontal line 57 of the green camera. The relative misregistration in the horizontal direction, as indicated by lines 59 and 61, is, however, the same as the horizontal misregistration indicated in Figure 2.

Figure 4:
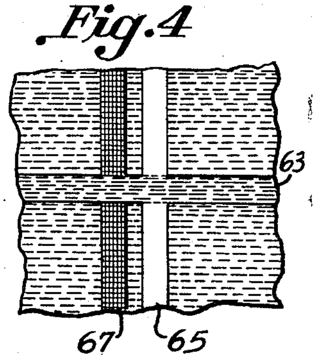

If, however, by proper optical, physical or electrical adjustment the vertical registration can be made perfect, an indication such as illustrated in Figure 4 will be had on the monitor scope 27.

Theoretically there should be no indication if both signals cancel each other; practically, however, by reason of slight differences in signal strength there will appear a dark gray or light gray line at position 63.

In Figure 4 the dark gray line 63 indicates registration of both white and black lines from color cameras 15 and 13. It will be noted here in Figure 4, as in Figures 2 and 3, that the horizontal registration is not accurate, as indicated by the white line 65 and the black line 67.

Figure 3:
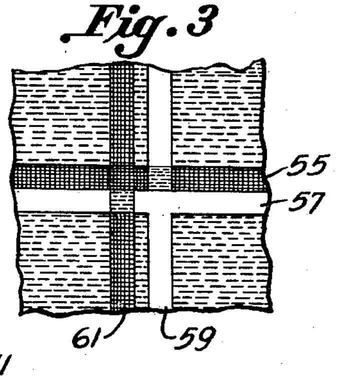
Figure 5:
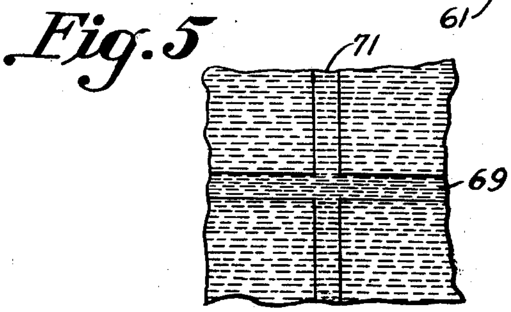

If, now, horizontal registration adjustments are made, an indication such as that shown in Figure 5 will be obtained. The horizontal dark gray line 69 and the vertical dark gray line 71 without adjacent black lines, as shown in Figures 2, 3 and 4 above, indicate accurate registry at that particular area of the test pattern.

The polarity of the separate signal trains does not matter just so long as they are 180° out of phase with each other.

Figure 6:
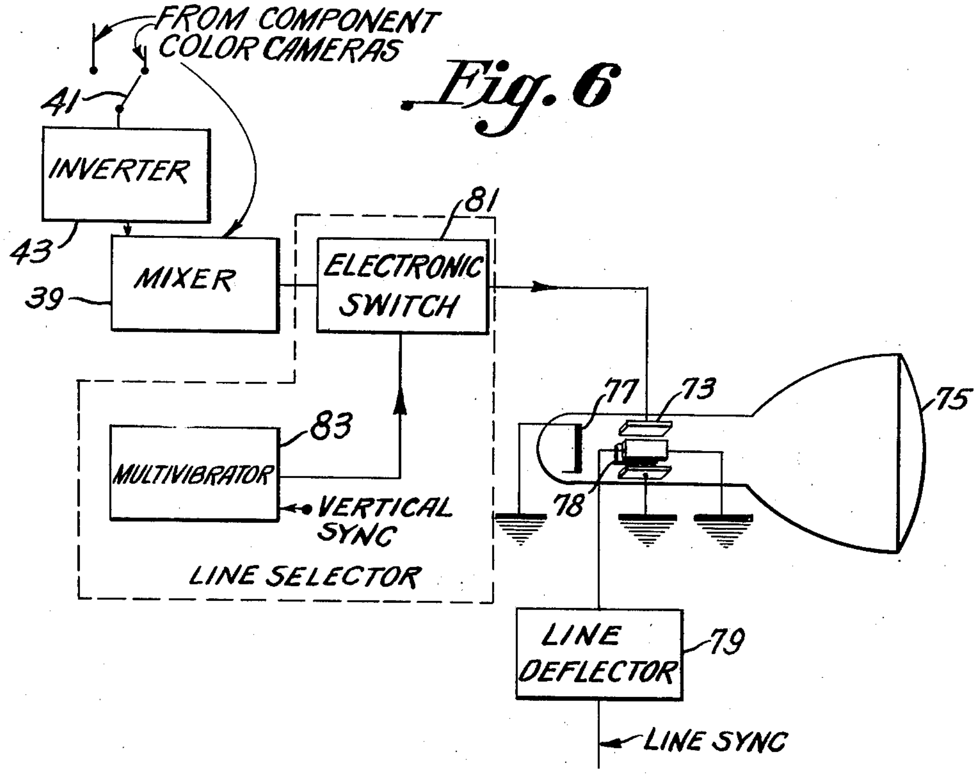
Figure 6 illustrates by block diagram another from of this invention.

Turning now in detail to Figure 6, there is shown another form of this invention wherein the mixed component color image signals are applied to the deflecting plates as distinguished from being applied to the intensity control electrode of that form of the invention shown in Figure 1 above.

A signal from one of the component color cameras such as the green color camera 15 of Figure 1 is applied to the mixer 39 of Figure 6. A switch 41 furnishes inverter or polarity reverser 43 of Figure 6 with signals from one or the other of the component color cameras.

The two signals are then mixed in mixer 39, as was done in the form of the invention shown in Figure 1, and applied to one set of the deflecting plates, such as vertical deflecting plates 73 of cathode ray tube 75. The cathode ray tube 75, which also is a type of monitor scope, also has the usual form of electron gun 77 to produce an electron beam of substantially uniform intensity.

The other set of deflecting plates, such as the horizontal deflecting plates 78, has applied thereto a deflection potential having a frequency and amplitude characteristic similar to that in customary horizontal deflection in television cathode ray beam tubes. This may be accomplished by obtaining a sawtooth wave of line frequency from any suitable horizontal deflection signal generator, as indicated in block 79 as line deflector. The line deflector 79 is synchronized in the well known manner.

If, however, the video signals are applied continuously to the vertical deflecting plates 73, there will be as many traces on the tube as there are lines in the scanning raster, and obviously this would offer little information. In accordance with cathode ray oscilloscope procedures, however, an arrangement called a line selector is provided which includes, as exemplary, an electronic switch 81 inserted in the video circuit to interrupt or open that circuit all the time except for the time duration of a single specific or small group of scanning lines. This is accomplished by keying the electronic switch 81 into operation each time a predetermined scanning line or scanning lines are being scanned by the camera tube. This can be, and is, normally accomplished by employing a multivibrator 83 which is keyed into operation by the vertical synchronizing signal. Other arrangements for keying the monitor into operation by line selection may be provided.

Figure 7:
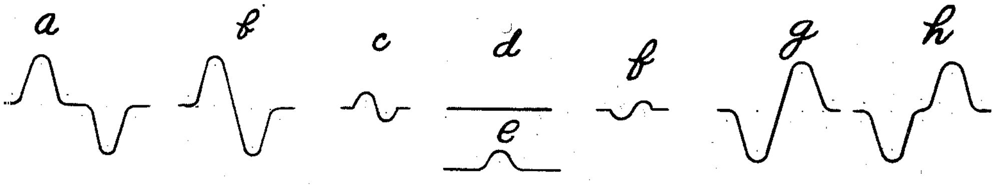
Figure 7 shows graphically the operation of a form of the invention such as illustrated by block in Figure 6.

The operation of the form of the invention shown in Figure 6 will best be understood by referring to Figure 7, wherein there is illustrated a number of curves indicating misregistration and registration of horizontal deflection.

In curve "*a*" of Figure 7, the screen of the oscilloscope cathode ray tube 75 will indicate at any vertical line of the test pattern which is scanned an upward deflection for one camera, for example, the green camera, and a downward deflection for another camera, such as the blue camera. Such an indication as illustrated by curve "*a*" would therefore show that the blue camera scanning is slightly to the right of the green camera scanning. As the scanning of the two cameras is brought closer together in a horizontal direction, a curve "*b*" will be indicated, showing a closer relationship in a horizontal direction between the scanning of the two cameras under comparison.

As the registration is improved further, the amplitude of the curve will be reduced as indicated by curve "*c*."

When, however, the horizontal deflection is in registry, the signals from both cameras will tend to cancel themselves if their amplitude is adjusted to be equal such as to obtain a straight line, as indicated in curve "*d*" of Figure 7. If, however, the amplitude of the signals from both cameras is not equal but the scanning of both cameras under test is in registry, a curve such as that indicated by curve "*e*" will result on the screen of the monitor scope 75.

If, however, the adjustment in scanning registry is such that the correction proceeded too far in the direction to cause the signal from the green camera to occur after the signal from the blue camera by reason of misregistration, an indication such as that shown in curve "*f*" will result. If this misregistration is carried out to a greater extent in the opposite direction from that indicaed by curves "*a*," "*b*" and "*c*," the curves "*g*" and "*h*" will occur.

The employment of a test pattern was shown as illustrative. An indication of registry may be obtained if any suitable object or scene is employed which has therein some horizontal and vertical lines of distinction.

Although the explanation of the operation of this invention has been directed primarily to a color television system for which it is particularly applicable, this same arrangement taught by the invention may be employed to advantage in other systems and arrangements wherein accurate registry of several images is required.

Likewise, blue, green and red component colors were selected by way of example. It is, of course, not intended that the invention should be limited to the use thereof.

Having thus described the invention, what is claimed is:

1. An image monitor arrangement for systems of the type involving a plurality of image signal producing cameras, each with associated signal amplifying circuits, said monitor arrangement comprising an object having cross lines and positioned to project component color images on all of said different selected component color cameras, a monitor scope having a signal input circuit, an electrical mixer having an output circuit connected to said scope input circuit, a pair of input circuits for said mixer, a connection between one signal input circuit of said mixer and one of said signal amplifying circuits associated with said cameras, and a connection between the other of said signal input circuits of said mixer and another of said signal amplifying circuits associated with said cameras.

2. An image monitor arrangement for color television systems of the type employing a plurality of different selected component color image signal producing cameras, each with associated signal amplifying circuits, said monitor arrangement comprising an object having cross lines and positioned to project component color images on all of said different selected component color cameras, a monitor scope having a signal input circuit, an electrical mixer having an output circuit connected to said scope input circuit, a pair of input circuits for said mixer, a connection between one signal input circuit of said mixer and one of said signal amplifying circuits associated with said cameras, a connection between the other of said signal input circuits of said mixer and another of said signal amplifying circuits associated with said cameras, and a signal inverter in one of said connections between said mixer and one of said signal amplifying circuits associated with said cameras.

3. An image monitor arrangement for systems of the type involving the transmission of a plurality of images to be registered and employing a plurality of signal producing cameras, each with associated signal amplifying circuits, said monitor arrangement comprising an object having cross lines and positioned to project component color images on all of said cameras, a monitor scope having a signal input circuit, said signal input circuit including a beam intensity control electrode, an electrical mixer having an output circuit connected to the beam intensity control electrode of said scope input circuit, a pair of input circuits for said mixer, a connection between one signal input circuit of said mixer and one of said signal amplifying circuits associated with said cameras, a connection between the other of said signal input circuits of said mixer and another of said signal amplifying circuits associated with said cameras, and a signal polarity reverser in one of said connections between said mixer and one of said signal amplifying circuits associated with said cameras.

4. An image monitor arrangement for systems of the type involving the transmission of a plurality of images to be registered and employing a plurality of different selected component color image signal producing cameras, each with associated signal amplifying circuits, said monitor arrangement comprising an object having cross lines and positioned to project component color images on all of said different selected component color cameras, a monitor scope having a signal input circuit, said signal input circuit including a beam deflection arrangement, an electrical mixer having an output circuit connected to the beam deflection arrangement of said scope input circuit, a pair of input circuits for said mixer, a connection between one signal input circuit of said mixer and one of said signal amplifying circuits associated with said cameras, a connection between the other of said signal input circuits of said mixer and another of said signal amplifying circuits associated with said cameras, and a signal inverter in one of said connections between said mixer and one of said signal amplifying circuits associated with said cameras.

5. An image monitor arrangement for color television systems of the type employing substantially red, blue and green component color image pickup devices, each with associated signal amplifying circuits, said monitor arrangement comprising an object having cross lines and positioned to project component color images on all of said different selected component color image pickup devices, a monitor scope having a signal input circuit, an electrical mixer having an output circuit connected to said scope input circuit, a pair of input circuits for said mixer, a connection between one signal input circuit of said mixer and one of said signal amplifying circuits associated with said image pickup devices, a connection between the other of said signal input circuits of said mixer and another of said signal amplifying circuits associated with said image pickup devices, and a signal inverter in one of said connections between said mixer and one of said signal amplifying circuits associated with said image pickup devices.

6. An image monitor arrangement for color television systems of the type employing substantially red, blue and green component color image pickup devices, each with associated signal amplifying circuits, said monitor arrangement comprising an image having cross lines and positioned to project component color images on all of said different selected component color image pickup devices, a monitor scope having a signal input circuit, an electrical mixer having an output circuit connected to said scope input circuit, a pair of input circuits for said mixer, a connection between one signal input circuit of said mixer and one of said signal amplifying circuits associated with said cameras, a selectable connection between the other of said signal input circuits of said mixer and the other of said signal amplifying circuits associated with said image pickup devices, and a signal inverter in one of said connections between said mixer and one of said signal amplifying circuits associated with said image pickup devices.

7. An image monitor arrangement for systems of the type involving a plurality of image signal producing devices, each with associated signal amplifying circuits, said monitor arrangement comprising a test pattern having cross lines and positioned to be scanned by each of said image signal producing devices, a kinescope having cathode ray beam deflection of the same rate as the deflection rate of said image signal producing devices, an electrical mixer having an output circuit connected to said scope input circuit, a pair of input circuits for said mixer, a connection between one signal input circuit of said mixer and one of said signal amplifying circuits associated with said image signal producing devices, a connection between the other of said signal input circuits of said mixer and another of said signal amplifying circuits associated with said image signal producing devices, and a signal inverter in one of said connections between said mixer and one of said signal amplifying circuits associated with said image signal producing devices.

8. An image monitor arrangement for color television systems of the type employing a plurality of different selected component color image signal producing cameras, each with associated signal amplifying circuits, said monitor arrangement comprising in combination an object having cross lines and positioned to project component color images on all of said different selected component color cameras, a monitor scope having a signal input circuit, means for combining the signal of one of said cameras with the inverted signal of another of said cameras, and a connection to apply said combined signals to said signal input circuit of said monitor scope.

9. An image monitor arrangement for color television systems of the type employing a plurality of different selected component color image signal producing cameras for systems of the type involving the transmission of a plurality of images to be registered, said monitor arrangement comprising a signal amplifying circuit for each of said cameras, an object having cross lines and positioned to project component color images on all of said different selected component color cameras, a monitor scope having a signal input circuit, a line selector in said signal input circuit, said signal input circuit also including a beam deflection arrangement, an electrical mixer having an output circuit connected to the beam deflection arrangement of said scope input circuit, a pair of input circuits for said mixer, a connection between one signal input circuit of said mixer and one of said signal amplifying circuits associated with said cameras, a connection between the other of said signal input circuits of said mixer and another of said signal amplifying circuits associated with said cameras, and a signal inverter in one of said connections between said mixer and one of said signal amplifying circuits associated with said cameras.

10. An image monitor arrangement for systems of the type involving a plurality of image signal producing cameras, each with associated signal amplifying circuits, said monitor arrangement comprising an object having cross lines and positioned to project component color images on all of said different selected component color cameras, a monitor scope having a signal input circuit, a line selector in said signal input circuit, an electrical mixer having an output circuit connected to said scope input circuit, a pair of input circuits for said mixer, a connection between one signal input circuit of said mixer and one of said signal amplifying circuits associated with said cameras, and a connection between the other of said signal input circuits of said mixer and another of said signal amplifying circuits associated with said cameras.

ALDA V. BEDFORD.

REFERENCES CITED

The following references are of record in the file of this patent:

UNITED STATES PATENTS

| Number | Name | Date |
|---|---|---|
| 2,253,292 | Goldsmith | Aug. 19, 1941 |
| 2,335,180 | Goldsmith | Nov. 23, 1943 |
| 2,373,114 | Goldsmith | Apr. 10, 1945 |
| 2,415,059 | Zworykin | Jan. 28, 1947 |